United States Patent [19]

Eaker

[11] Patent Number: 5,526,837
[45] Date of Patent: Jun. 18, 1996

[54] SOLENOID CONTROLLED ONE-WAY VALVE

[75] Inventor: Garlan L. Eaker, Louisville, Tenn.

[73] Assignee: Robertshaw Controls Company, Richmond, Va.

[21] Appl. No.: 385,559

[22] Filed: Feb. 8, 1995

Related U.S. Application Data

[63] Continuation-in-part of Ser. No. 348,540, Dec. 1, 1994, Pat. No. 5,487,407.

[51] Int. Cl.$^6$ .................................................. F16K 31/02
[52] U.S. Cl. .................. 137/1; 251/129.15; 251/129.21; 251/76
[58] Field of Search .................... 251/129.01, 129.15, 251/129.2, 76, 129.21; 137/1

[56] References Cited

U.S. PATENT DOCUMENTS

| | | |
|---|---|---|
| 2,873,760 | 2/1959 | Safford . |
| 3,308,846 | 3/1967 | Yuile . |
| 4,148,337 | 4/1979 | Ellmers ..................................... 137/493 |
| 4,245,667 | 1/1981 | Braukmann . |
| 4,304,258 | 12/1981 | Mitchell ................................. 251/76 X |
| 4,485,843 | 12/1984 | Wolff . |
| 4,596,271 | 6/1986 | Brundage . |
| 4,631,923 | 12/1986 | Smith . |
| 4,799,506 | 1/1989 | Taylor . |
| 4,932,434 | 6/1990 | Taylor . |
| 5,056,556 | 10/1991 | Nishimoto et al. . |
| 5,230,364 | 7/1993 | Leng et al. . |
| 5,375,811 | 12/1994 | Reinicke ............................ 251/129.16 |

*Primary Examiner*—Kevin Lee
*Attorney, Agent, or Firm*—Watts, Hoffmann, Fisher & Heinke Co.

[57] ABSTRACT

A poppet valve assembly comprising a valve housing defining a chamber and first and second spaced apart flow openings enabling flow through the chamber, a valve seat surrounding one opening, a valving member comprising a valving element positioned for engagement with the valve seat and a stem element fixed to and projecting from the valving element, the valving element movable between an open position spaced from the valve seat for enabling fluid flow through the housing and a closed position engaged with the valve seat, a solenoid assembly comprising an armature movable with respect to the valving member and the valve housing, the solenoid having an energized condition wherein the armature is subjected to an electromagnetic force and a de-energized condition, a spring system reacting between the housing and the valving member and coacting with the solenoid assembly to control positioning of the valving member, and anti-adhesion structure operative to shed material bridging the valve seat and the valving member when the solenoid is energized and enable seating and unseating of the valving member.

14 Claims, 7 Drawing Sheets

SOLENOID CONTROLLED ONE-WAY VALVE

RELATED APPLICATION

The present application is a continuation-in-part of application Ser. No. 08/348,540, filed Dec. 1, 1994, U.S. Pat. No. 5,487,407, entitled Solenoid Controlled One-Way Valve.

FIELD OF THE INVENTION

The present invention relates to valves controlled to permit flow in one operating condition and which are subjected to shock loads to minimize the possibility of the valves being stuck in their closed positions.

BACKGROUND OF THE INVENTION

One-way valves for controlling flow in fluid systems are relatively common. Valves having one condition permitting flow in one direction within a system while, in a second condition, remaining opened or closed are less common.

For example, U.S. Pat. No. 3,308,846 discloses a pressure relief valve which is closed by the combined forces of an energized solenoid and a spring element. When a predetermined system pressure is sensed the solenoid is de-energized. The system pressure force overcomes the spring element force so the valve opens to vent the system to the atmosphere and relieve the pressure. Sensing a reduced system pressure re-energizes the solenoid, reclosing the valve.

U.S. Pat. No. 5,056,556 discloses a solenoid and single spring associated with a complex, multipart valving arrangement. The '556 patent valve is described as functioning as a relief valve as well as an on-off valve.

U.S. Pat. No. 4,631,923 discloses a valve arrangement in which a valving member is acted upon by a compression spring to close the valve and alternatively, when the solenoid is energized, by a tension spring to enable flow.

Where solenoid operated valves have been used to control air flow in out-of-doors settings, for example in automotive vehicles, low ambient temperatures have caused operational problems. For instance it has not been uncommon for such valves to be frozen in one operating condition. A typical case is where atmospheric moisture condenses and freezes while adhered to a valving member and a seat with which the valving member is engaged. Such a valve is frequently "stuck" in its closed condition until melting occurs.

The present invention provides a new and improved fluid flow control valve assembly having one operating condition wherein a valving member enables one-way system fluid flow and a second operating condition in which the valve is closed to system flow and wherein the valve assembly is so constructed and arranged that the valving member is shocked to minimize the likelihood of the valving member being stuck closed when the valve assembly is in the first operating condition.

SUMMARY OF THE INVENTION

A preferred embodiment of the invention provides a poppet valve assembly comprising a valve housing defining a chamber and first and second spaced apart flow openings enabling flow through the chamber, a valve seat surrounding one opening, a valving member comprising a valving element positioned for engagement with the valve seat and a stem element fixed to and projecting from the valving element, the valving element movable between an open position spaced from the valve seat for enabling fluid flow through the housing and a closed position engaged with the valve seat, a solenoid assembly comprising an armature movable with respect to the valving member and the valve housing, the solenoid having an energized condition wherein the armature is subjected to an electromagnetic force and a de-energized condition, a spring system reacting between the housing and the valving member and coacting with the solenoid assembly to control positioning of the valving member, and anti-adhesion structure operative to shed material bridging the valve seat and the valving member when the solenoid is energized and enable seating and unseating of the valving member.

According to one preferred embodiment of the invention the anti-adhesion structure comprises a valve member shocking mechanism comprising a striker connected to the armature for movement therewith when the solenoid is energized, and an anvil carried by the valving member. The striker impacts the anvil when the solenoid is energized.

According to another feature of the invention the anti-adhesion structure comprises a resilient low friction film defining a resilient low friction seating surface formed on the valving element or the seat.

Further features and advantages of the invention will become apparent from the following description of a preferred embodiment made in reference to the accompanying drawings which form part of the specification.

BEST MODE FOR PRACTICING THE INVENTION

Figure 1:
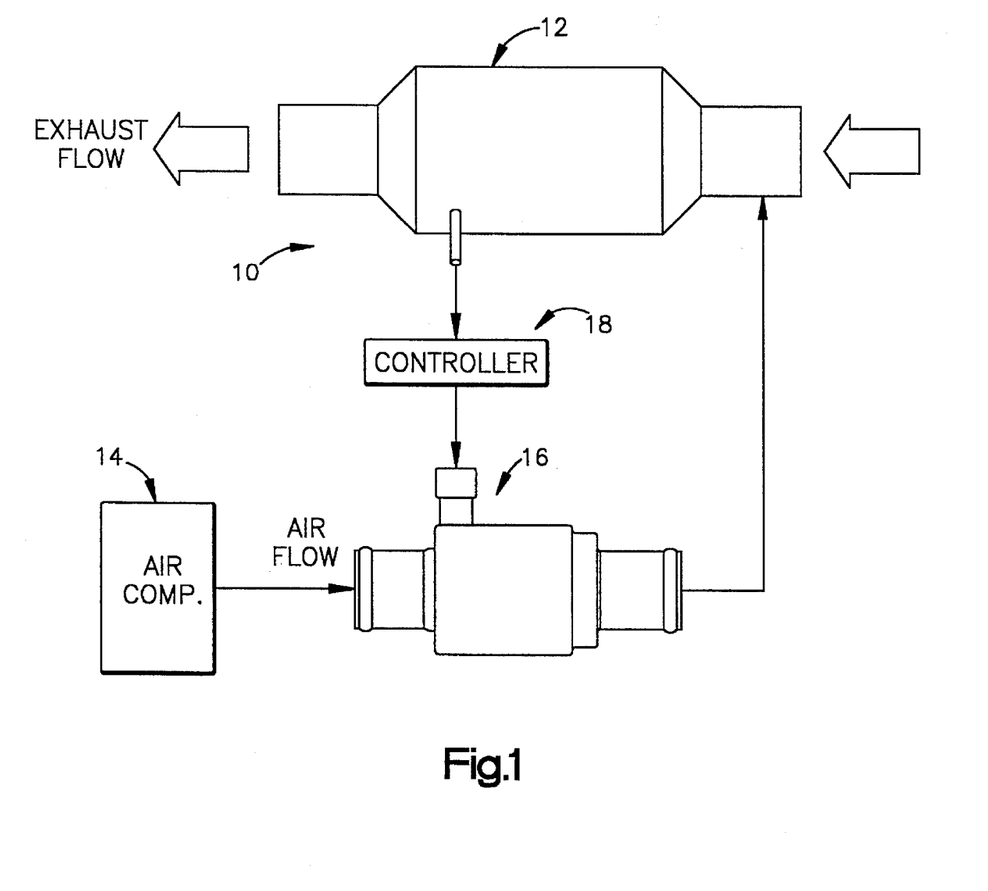
FIG. 1 is a partially diagrammatic illustration of a fluid system incorporating a valve assembly embodying the present invention.

FIG. 1 of the drawings illustrates a fluid system 10 in the form of an automotive vehicle exhaust system. The system 10 comprises a catalytic converter 12 for conditioning exhaust gas directed through it from a vehicle engine (not illustrated), an air compressor 14 operated from the engine for compressing atmospheric air, a valve assembly 16 for enabling compressed air flow to the catalytic converter in predetermined circumstances and a controller 18 governing operation of the valve assembly in response to a sensed condition. The illustrated valve assembly is connected between the compressor and the catalytic converter by conventional flexible air hoses.

The catalytic converter 12 may be of any conventional or suitable construction and is not illustrated or described in detail. Suffice it to say the converter is of a type which loses effectiveness when temperatures are outside a given range. Supplemental air is introduced to the converter 12 in these circumstances to reestablish or enhance converter effectiveness. The catalytic converter 12 typically operates at internal pressures which vary considerably above atmospheric pressure. Supplemental air flows to the converters must therefore be supplied from a source of compressed air.

The compressor 14 is a relatively small air compressor, which may be of any conventional or suitable construction, and provides the source of supplemental catalytic converter air. When the exhaust gas pressure in the catalytic converter exceeds the compressor outlet pressure, exhaust gas backflows into the compressor 18 must be blocked to prevent damaging the compressor. The valve assembly 16 precludes the engine exhaust from entering the air compressor.

The controller 18 provides an electrical output signal which operates the valve assembly. The controller 18, for purposes of this description, is a temperature responsive electrical circuit which produces the valve operating electrical output signal. The controller 18 may be of any suitable or conventional design and therefore is not illustrated in detail. The output signal for operating the valve assembly can be provided directly from controller circuitry, e.g. from an output transistor, or the like, or via contacts of a switch operated by the controller.

Figure 2:
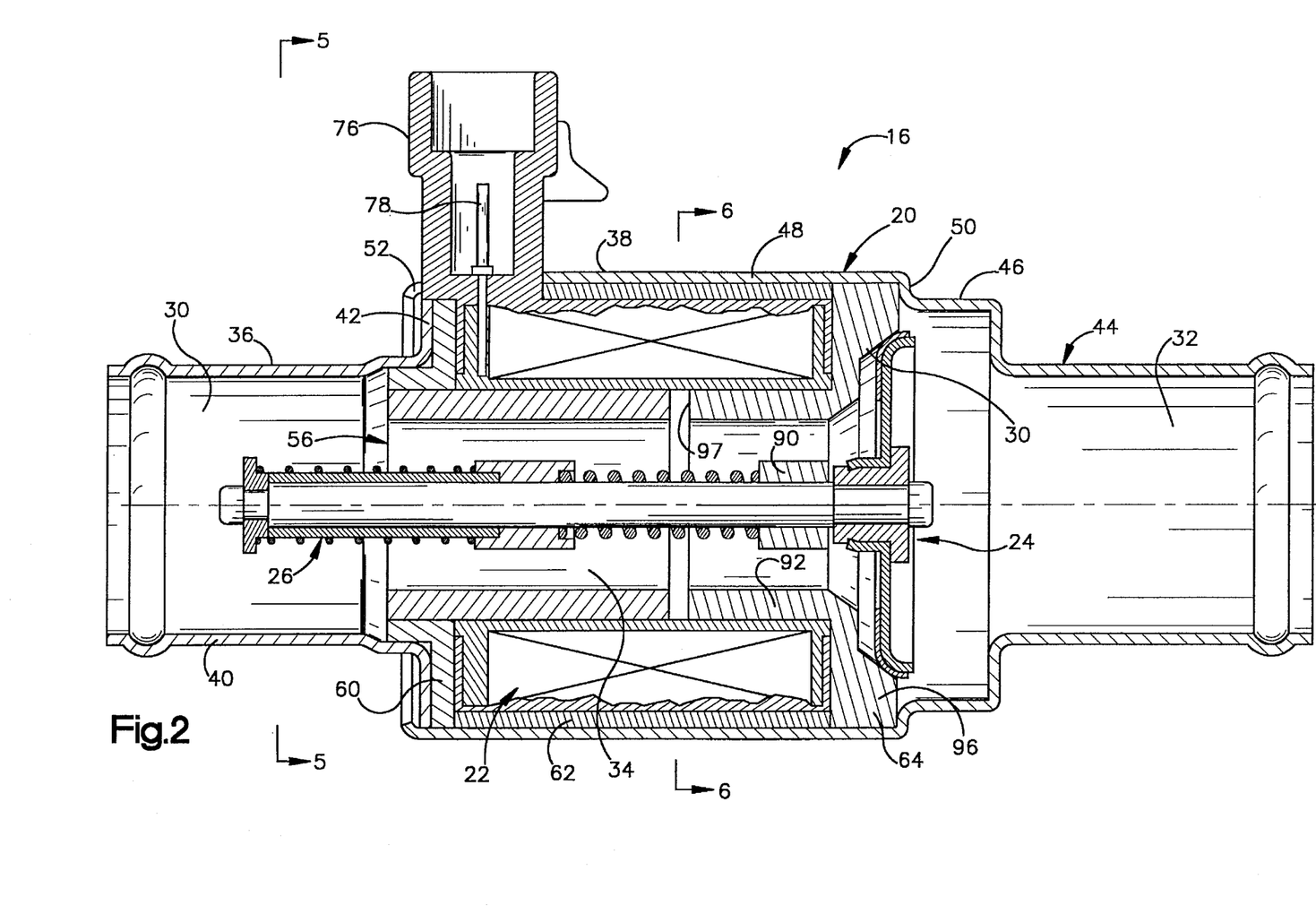
FIG. 2 is cross sectional view of a valve assembly constructed according to the invention.
Figure 3:
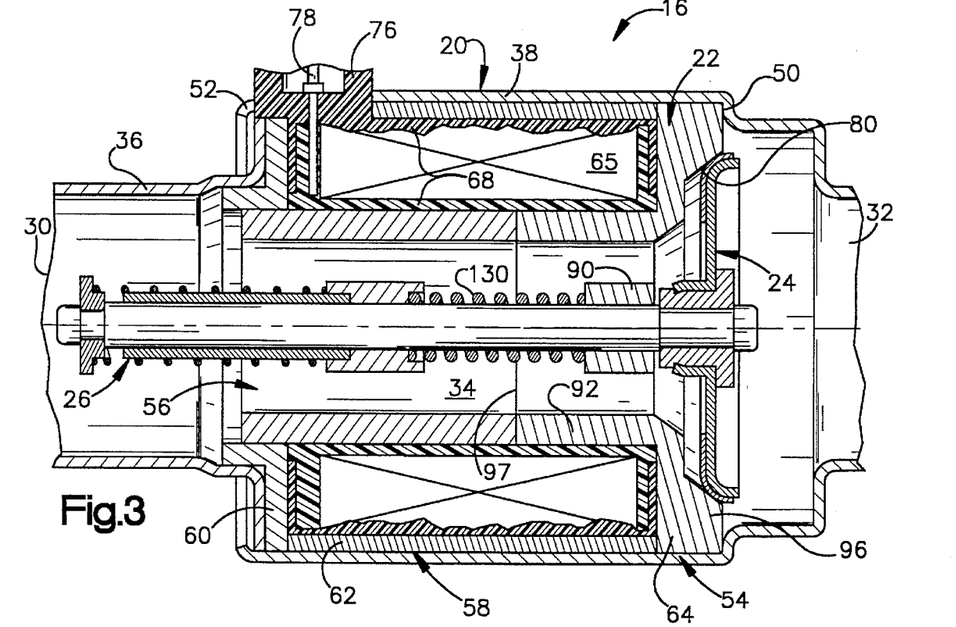
FIG. 3 is a fragmentary cross sectional view of a valve assembly similar to that of FIG. 2 with the valve assembly illustrated in an alternative operating condition.
Figure 4:
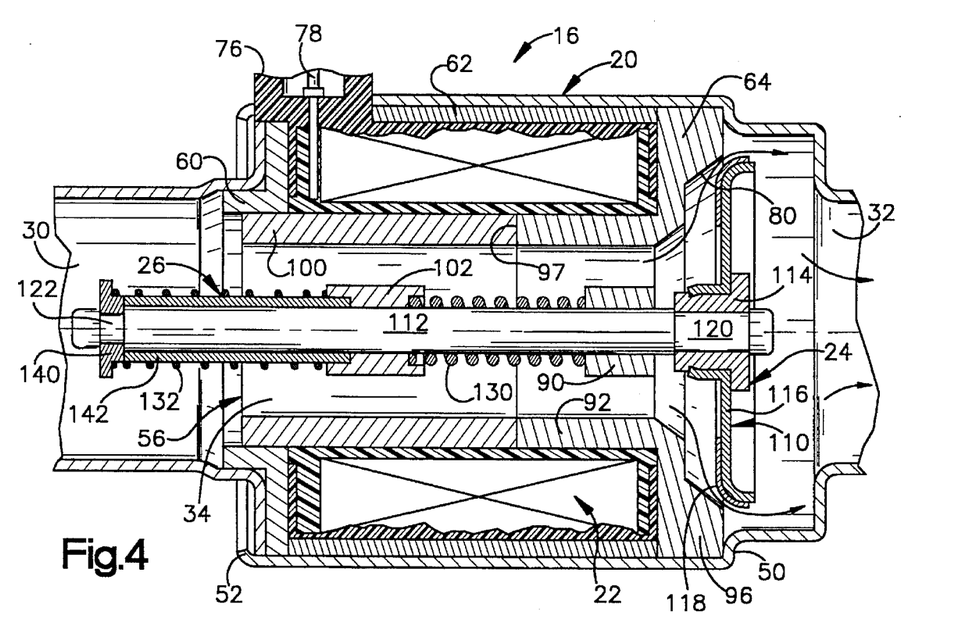
FIG. 4 is a fragmentary cross sectional view of a valve assembly similar to that of FIG. 2 with the valve assembly illustrated in still another alternative operating condition.

When the illustrated valve assembly 16 is de-energized it blocks flow in either direction through it. When the controller 18 detects temperatures beyond a predetermined range and energizes the valve assembly 16, it is then conditioned to operate as a check valve. As such it enables supplemental air flow from the compressor to the converter so long as the compressor output pressure remains greater than the converter pressure. Should the converter pressure increase above the compressor output pressure the valve 16 closes to block any backflow. Referring to FIGS. 2–4, the valve assembly 16 comprises a valve housing 20, a solenoid assembly 22, a valving member 24 within the housing, and a spring system, generally designated by the reference character 26, coacting with the solenoid for exerting force on the valving member.

The valve housing 20 defines a fluid flow inlet 30, a fluid flow outlet 32 and a flow passage, or path, 34 extending through the housing 20 between the inlet and outlet. In the preferred embodiment the valve housing 20 is formed by first and second tubular body members 36, 38 which are hermetically clinched together.

The body member 36 defines a seamless cylindrical hose nipple 40 terminating in a radial flange 42 abutting the solenoid assembly 22. The body member 38 is a seamless stepped cylinder defining a hose nipple 44, an enlarged valve chamber section 46 and a cylindrical solenoid support section 48. The section 48 tightly clamps the solenoid assembly against the flange 42 between a shoulder 50 and an opposed lip 52 crimped into engagement with the flange 42. The housing 20 tightly engages the solenoid assembly so that there is minimal air leakage from the housing.

The solenoid assembly 22 is electrically energized from the controller 18 for changing the operational state of the valve assembly. The solenoid assembly 22 comprises a stator assembly 54 and an armature 56 actuated by the stator assembly. The stator assembly is fixed in the housing 20 and electrically coupled to the controller 18 via output signal leads. The armature 56 is disposed within the stator on the flow path 34.

The stator assembly comprises a generally cylindrical, unitary coil assembly 58 and pole pieces 60, 62, and 64 associated with the coil and the armature. The fluid flow path 34 extends through central openings in the stator assembly. Air flowing along the path 34 is in convective heat transfer relationship with the stator assembly and cools the stator assembly to reduce electrical resistance heating.

The coil assembly 58 comprises an insulated wire coil 65 wound into a cylindrical shape on a spool 66 and a plastic insulating body 68 encapsulating the coil and spool so that the assemblage forms a unitary cylindrical body. The insulator body 68 forms a receptacle 76 projecting radially from coil assembly and through a slot in the solenoid support section 48 of the housing 20. The receptacle surrounds terminal posts 78 (only one of which is illustrated) respectively attached to opposite ends of the coil wire 65. The controller leads plug into the receptacle 76 and in so doing establish cornact with the terminal posts.

The pole pieces 60, 62 and 64 are magnetically coupled to each other, the coil 65 and to the armature 56 to form a magnetic circuit capable of producing armature operating magnetomotive force. The pole piece 60 is damped against the coil assembly and pole piece 62 by the housing flange 42. The illustrated pole piece 60 is an annular member having a radial flange-like body engaging the pole piece 62 at its outer periphery and an inner, cylindrical collar extending closely about the armature. The collar and armature are closely spaced so that the armature can move freely relative to the pole piece 60 along the axis of the collar yet a minimal clearance air gap exists between them. Accordingly the armature 56 and the pole piece 60 are magnetically coupled relatively efficiently.

The pole piece 62 is a cylindrical member extending about the coil assembly 58 between the pole pieces 60, 64. The pole piece 62 is damped between the pieces 60, 64 so that the flux path through these pole pieces is uninterrupted by an air gap.

Figure 6:
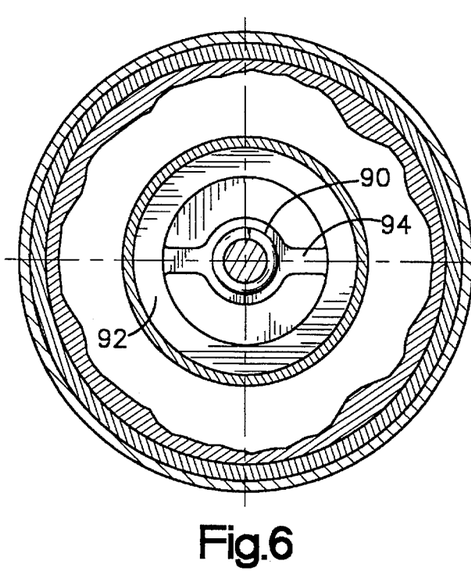
FIG. 6 is a cross sectional view of the valve assembly of FIG. 2 seen approximately from the plane indicated by the line 6—6 of FIG. 2.

The pole piece 64 is constructed and arranged to form part of the flow path 34, support and guide the valving member 24 and form a valve seat 80 for the valving member. The pole piece 64 comprises a central hub 90, a cylindrical collar 92 extending about the hub 90, struts 94 (FIG. 6) connecting the hub and collar, and an annular body 96 extending radially outwardly from an end of the collar beyond the coil 65 into engagement with the pole piece 62. The illustrated pole piece 64 is formed from powdered magnetic metal which is molded to form a single continuous member.

The collar 92 is disposed in the coil assembly central opening with its outer cylindrical surface snugly surrounded by the insulator body 68, its cylindrical inner surface forming part of the flow path 34 and its inner end wall 97 confronting the armature and forming an armature travel limiting stop.

The illustrated hub 90 supports the valving member 24 for reciprocating movement in the direction of the flow path axis. The hub 90 is a cylindrical member disposed coaxially with the collar 92 and defining a smooth valve member supporting bore. The struts 94 rigidly support the hub 90 within the collar 92. In the illustrated embodiment of the invention two diametrically opposed struts 94 (see FIG. 6) extend through the flow path 34 between the hub and the collar.

The armature 56 is slidably disposed within the insulator body 68 and the pole piece 60 for reciprocating motion when the coil is energized and deenergized. The armature 56 comprises a tubular cylindrical body 100, a hub 102 disposed on the central axis of the body 100 and struts 104 (FIG. 5) fixing the hub relative to the body 100. The illustrated armature 54 is formed from a molded body of magnetic powdered metal. A cylindrical bushing (not illustrated) may be fixed in the insulator body 68 for guiding the armature. The guide bushing is preferably constructed from a thin sheet of phosphor bronze or the like.

Figure 5:
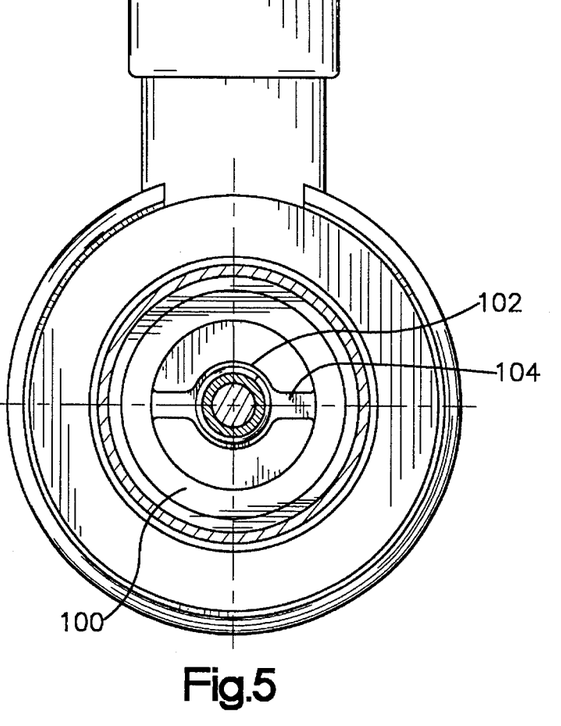
FIG. 5 is a cross sectional view of the valve assembly of FIG. 2 seen approximately from the plane indicated by the line 5—5 of FIG. 2.

The struts 104 are preferably diametrically opposed and extend through the flow path 34 between the hub 102 and the body 100. The struts support the hub 102 in the armature and the hub 102 in turn supports the valving member 24 for movement relative to the armature. The hub 102 defines a central smooth bore for receiving the valving member. The body 100 is disposed within the pole piece 60 whether the coil 65 is energized or not so that the pole piece 60 and the armature are always positioned with respect to each other for efficient magnetic coupling.

The valving member 24 comprises a valving element 110 positioned for engagement with the valve seat 80 and a stem element 112 fixed to and projecting from the valving element. The valving element 110 is movable between an open position spaced from the valve seat 80 for enabling fluid flow through the valve housing via the flow passage 34 and a closed position engaged with the valve seat 80.

The valving element 110 is a poppet comprising a spool-like central body 114, a thin, radially extending sheet metal skirt 116 clinched to the body 114, and an annular sealing ring 118 fixed to the skirt for engaging the valve seat. The skirt has a central tubular section pressed between opposite spool flanges on the body 114. The skirt 116 projects radially to its outer periphery which is radiused and curves away from the valve seat 80 in the down stream direction. The annular sealing ring 118 is preferably a resilient rubber-like member bonded to the skirt for sealing engagement with the valve seat.

The valve stem element 112 is a cylindrical pin having opposite, reduced diameter ends 120, 122 and a central section slidably received in the hubs 90, 102. The central cylindrical stem section is coaxial with and slidably received in the aligned bores of the hubs 90, 102. The reduced diameter end 120 supports the valving element body 114. The projecting tip of the end 120 is upset, or peened over, to clamp the poppet 110 securely in place on the stem.

The spring system 26 coacts with the valving member 24, the stator assembly 54 and the armature 56 to maintain the valve assembly 16 dosed when the solenoid is de-energized as well as to enable one-way flow through the passage 34 when the solenoid is energized. The spring system 26 comprises a first spring 130 for opposing armature movement by the stator assembly, a second spring 132 reacting between the valve assembly and the armature for biasing the valving member toward its closed condition and force transmitting elements associated with the springs and the valving member 24. When the solenoid is de-energized both springs urge the valving member closed with sufficient combined force that the valving member blocks all flow through the passage. Solenoid energization cancels the valving member closing force provided by the spring 130 so that only the spring 132 biases the valving member closed. The biasing force is light so that when a relatively small pressure differential exists across the valving member poppet, one-way flow can occur.

The spring 130 is illustrated as a helical compression spring surrounding the valve stem element and compressed between the pole hub 90 and the armature hub 102. The force transmitting elements comprise a collar 140 fixed to the valve stem end 122 and a sleeve 142 surrounding the valve stem between the armature hub and the collar 140. When the solenoid assembly 22 is de-energized the force of the spring 130 acts directly on the valve assembly via the sleeve 142 which is engaged between the hub 102 and the collar 140.

The spring 132, which surrounds the sleeve 142, is a relatively light helical compression spring which also acts directly on the valve assembly via the collar 140. The combined spring forces maintain the valve assembly closed against all expected pressure differentials tending to open the valve.

When the solenoid assembly is energized the armature 56 is shifted toward the stator assembly 54 against the force of the spring 130. The magnetic force exceeds the spring force and the spring is compressed until the armature engages the pole piece wall 97. At that juncture, zero spring force is transmitted to the valving member through the sleeve 142. Consequently, the only closing force applied to the valving member is that provided by the spring 132. The spring 132 urges the valving member into engagement with the valve seat 80 with the collar 140 spaced away from the sleeve 142 (see FIG. 3).

When the differential pressure force acting on the valve poppet exceeds the bias force exerted by the spring 132, the valve assembly opens to enable air flow through the passage 34 (see FIG. 4). The limit of valve opening travel, and compression of the spring 132, is defined by engagement of the sleeve 142 with the collar 140 (FIG. 4). Whenever the pressure downstream from the valving member increases to a level approaching the upstream pressure, the valving member recloses. This avoids backflow to the compressor.

The typical operating condition of the valve assembly is with the solenoid energized and the valving member disengaged from the valve seat so that air flows through the valve housing. The air flow cools the solenoid coil.

Figure 7:
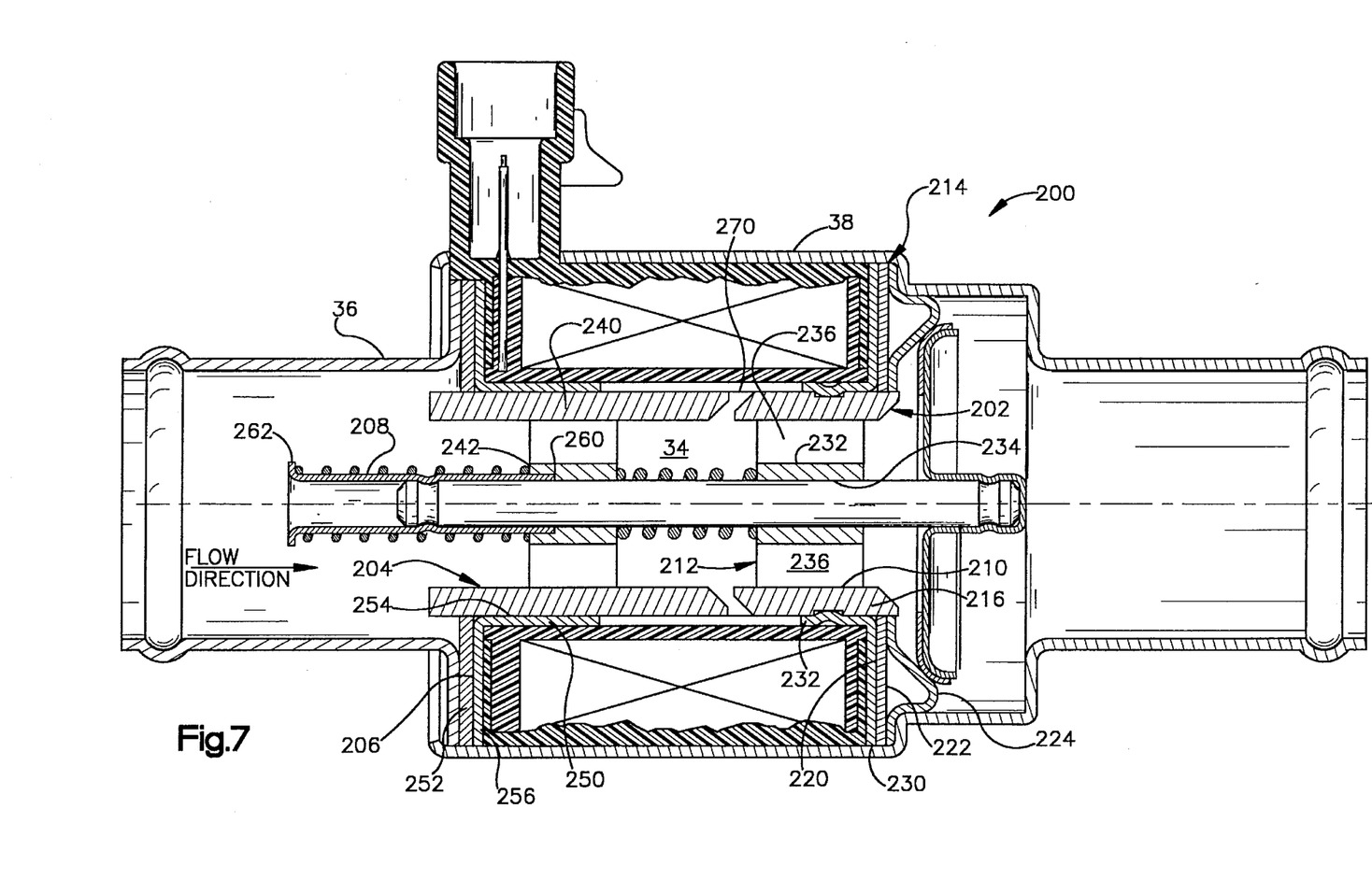
FIG. 7 is cross sectional view of a modified valve assembly constructed according to the invention.

FIG. 7 illustrates a modified valve assembly 200 which is similar to the valve assembly 16. The valve assembly 200 functions like the valve assembly 16 but is constructed differently in that the pole piece 64 is replaced by a multipart pole assembly 202, the armature 56 is replaced by an armature assembly 204, the pole piece 60 is replaced by a pole assembly 206, and the force transmitting elements 134 are replaced by a single element 208. In addition, the body members 36, 38 are formed from a magnetic material (preferably 430 stainless steel) and function as magnetic conductors so the pole piece 62 is eliminated.

The pole assembly 202 comprises a stator collar 210, a hub 212, and a pole section 214 magnetically coupled to the collar and to the body member 38. The collar 210 and the pole section 214 are formed from magnetic material, such as 430 stainless steel.

The stator collar 210 is fixed in the coil assembly and aligned with the armature assembly. When the solenoid is energized the armature assembly is magnetically attracted to the stator collar and moves to engage the collar. The collar 210 is an elongated cylindrical member extending within the coil assembly to form pan of the flow passage 34. A collar end section 216 projects from the end of the coil assembly for engagement and magnetic coupling with the pole section 214.

The pole section 214 is so constructed and arranged that it not only secures and supports the collar 210 in position with respect to the coil and armature assemblies but also forms the valve seat and provides efficient magnetic coupling with the collar. The pole section 214 comprises a collar support 220, a washer 222 and a valve seat 224. The collar support 220, washer 222 and valve seat 224 are clamped tightly together and against the coil by the housing body member 38. This assures that the collar is rigidly secured in place and that the pole elements are and remain magnetically coupled together.

The collar support 220 is formed by a flat annulus 230, extending radially from the housing body member 38 to the collar, and a cylindrical body 232 continuous with the annulus 230 and projecting into the coil assembly in surface contact with the collar periphery. The illustrated body 232 defines a circumferential, inwardly deformed wall segment extending into an aligned, conforming circumferential groove in the collar periphery to firmly lock the collar and body together.

The washer 222 and valve seat 224 are formed by annular elements having their outer peripheries engaged with the housing body member 38 and their inner peripheries engaging the collar 210. The washer 222 is a flat annulus while the valve seat member 224 is drawn to produce a circumferential generally frusto-conical seat section engaged by the valving member. The valving member is formed from a nonmagnetic sheet metal (e.g. 304 stainless steel) so there is no magnetic attraction between the valving member and the seat when the solenoid is energized.

The hub 212 is formed by a central body 232 defining a smooth bore 234 receiving and guiding movement of the valve stem and equally spaced struts 236 projecting from the central body 232 into tight engagement with the collar 210. The collar 210 is preferably secured to the hub by a "press" or "interference" fit formed by forcing the collar onto the struts in a suitable press.

The armature assembly 204 comprises a tubular cylindrical magnetic armature member 240 slidably disposed in the passage 34 and a hub 242 pressed into the member 240 for guiding valve stem motion relative to both the armature and the stator. The magnetic armature member 240 is aligned with the collar 210. When the coil is energized the armature member moves into engagement with the collar. The adjacent ends of the armature member and the collar define conforming conical faces which fully engage to maximize the surface contact between the members. This in turn maximizes the magnetic attractive force between the armature member and the collar 210.

The pole assembly 206 comprises a flanged sleeve body 250 and an annular pressure plate 252 for conducting flux between the housing body member 38 and the armature member 240. The body 250 has a cylindrical section 254 surrounding and extending along the armature member 240 and a radial flange 256 extending outwardly into engagement with the housing body member 38. The plate 252 is a washer-like magnetic member engaged with the housing body member 38 at its outer periphery and clamped into firm engagement with the body 250 by the housing body member 36.

The force transmitting element 208 is a thin sheet metal tube fixed to the valve stem and transmitting the force of the spring 132 to the valve stem for biasing the valve closed.

The tube 208 tightly surrounds the stem and has one end 260 telescoped into a countersunk section of the bore in the armature hub 242 and its opposite end 262 flared to retain the end of the spring 132. When the solenoid is energized the armature collar shifts to engage the stator collar 210. This eliminates the force applied to the valve stem by the spring 130 and reduces the closing force applied to the valve stem by the spring 132 as the armature hub moves away from the tube element 207. The relative dimensions of the tube 207 and the armature hub countersunk bore are determined so that the degree of valve opening while the solenoid is energized is limited to a predetermined maximum amount.

The valve assembly 200 is illustrated as incorporating a guide bushing 270 surrounding the armature collar for guiding its motion relative to the stator assembly. The guide bushing 270 extends between and is supported by the pole assemblies and is preferably constructed from a thin sheet of nonmagnetic material, such as phosphor bronze, which minimizes losses in the magnetic circuit through the pole assemblies and the armature collar.

Automotive vehicles in which valve assemblies constructed according to the invention are employed are subjected to environmental extremes including extremely low temperatures. In cold weather, moisture from combustion gases in the catalytic converter may condense onto the valve seat and poppet valving member after the engine ceases operation. The condensed moisture can freeze in a configuration which bridges the seat and valving member and adheres to both elements so that the valving member is stuck shut by ice when the engine is restarted. The valve assembly may thus be rendered incapable of supplying air to the converter upon restarting the engine unless the valving member can be unseated.

Figure 8:
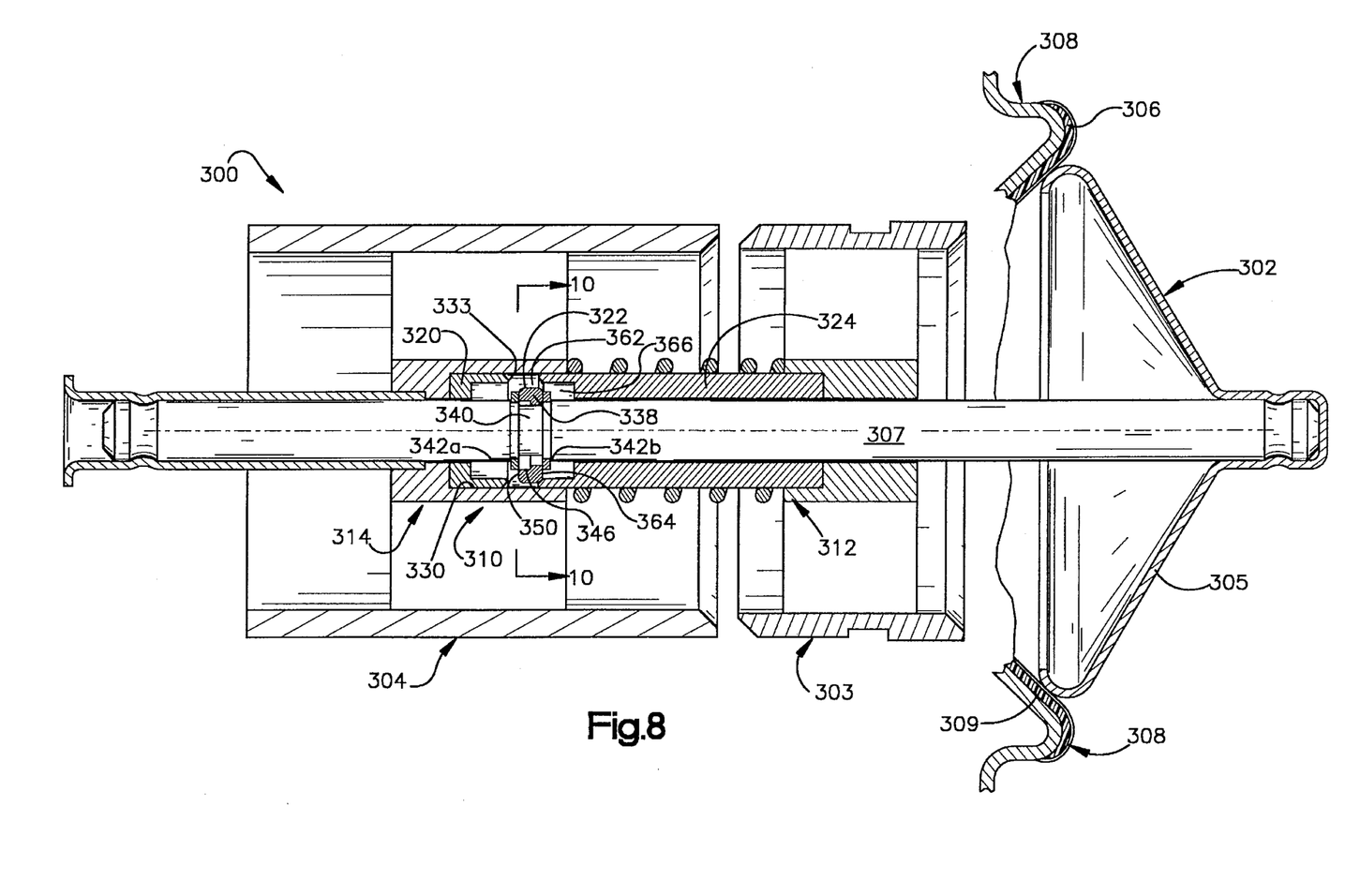
FIG. 8 is cross sectional view of part of a further modified valve assembly constructed according to the invention; and, FIG. 9 is an enlarged view of part of the modified valve assembly of FIG. 8; and, FIG. 10 is a cross sectional view seen approximately from the plane indicated by the line 10—10 of FIG. 8.
Figure 9:
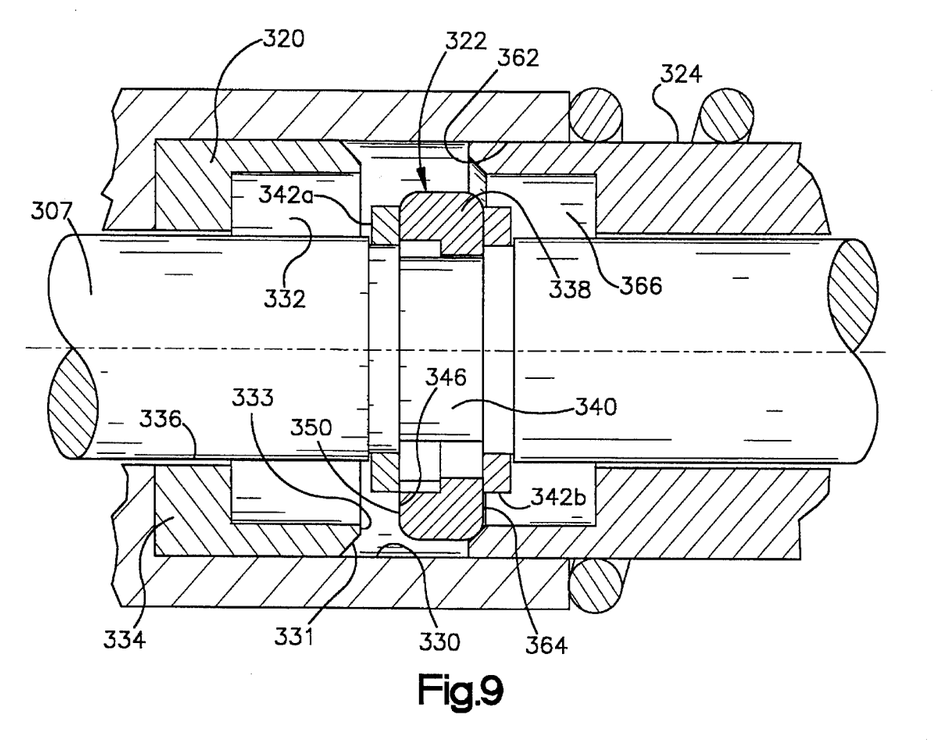
Figure 10:
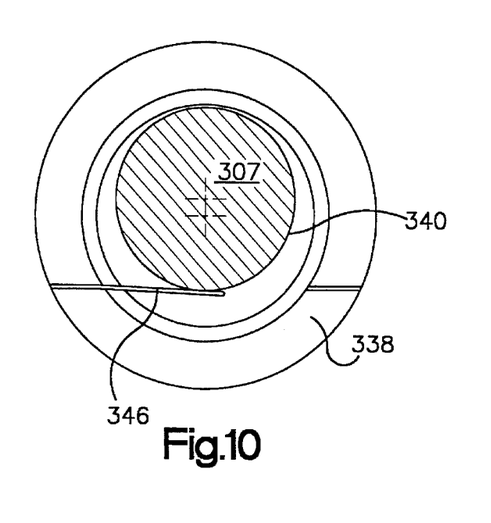

While hot engine exhaust gases eventually melt any valve disabling ice build-ups, undesirable exhaust emissions are quite large at engine start up before emission control components have warmed up and become fully operative. The supply of auxiliary air via the valve assembly 300 immediately upon engine startup, when called for, is therefore important. FIGS. 8–10 illustrate part of a further modified valve assembly 300 constructed according to the present invention which is so constructed and arranged that likelihood of the valving member 302 being stuck closed by adhesions, such as ice build-ups, is avoided when the valve assembly 300 is operated to its condition where one way flow is permitted.

The valve assembly 300 is constructed substantially like the valve assembly illustrated in FIG. 7 except that the stator (303) and armature (304) outer diameters are larger, the valving member 302 is modified in that the valving element 305 differs from the FIG. 7 embodiment, and the valve assembly 300 is provided with an anti-adhesion structure. The anti-adhesion structure comprises a resilient, low friction valve seating surface 306 and a valving member shocking mechanism 310 both incorporated in the valve assembly 300. The stator hub 312, armature hub 314 and the stem element 307 are modified to accommodate the shocking mechanism 310. Accordingly, the remaining elements of the valve assembly 300, such as the valve housing, the solenoid coil assembly, pole pieces, etc., are not illustrated in FIGS. 8–10 and are not described again here for the sake of brevity.

The illustrated valving element 305 is an imperforate, thin walled, sheet metal skirt-like structure crimped in place to one end of the stem element 307. The valving element 305 comprises an annular continuous peripheral seating surface 309 aligned with the valve seat 308, only part of which is illustrated. The valve seat 308 comprises a magnetic sheet metal pole piece 315 (constructed like the pole piece-seat 224) supporting the resilient, low friction valve seating surface 306 which is illustrated as formed by a relatively thin, low friction resilient film bonded to the pole piece 315. The film 306 comprises a rubber-like resilient substrate with a thin layer of low friction material (for example a polytetrafluoroethylene or similar film) adhered over it to form the valve seat surface.

The low friction valve seat film is smooth and forms an efficient seal with the valving element. Because it is a low friction material, the film tends to shed any ice formations which might otherwise adhere to the valve seat and to the valving element and cause the valve assembly to stick shut. Thus when the valving element is urged to its open position the film enables, or tends to enable, the valving member to be unseated without sticking shut because of ice build-ups. The film 306 is illustrated deposited on the valve seat but may also be fixed to the valving element 305.

The valve assembly 300 of FIGS. 8–10 differs from the previously described valve assemblies in that the stator and armature hubs coact with, and are aligned with, the valve shocking mechanism 310. This construction necessitates the central section of the valve assembly being somewhat enlarged compared to the valve assemblies of FIGS. 1–7. To maintain requisite air flow rates through the valve assembly the diametral extents of the stator and armature are enlarged, along with the diametral extent of the coil assembly, housing and other related parts.

The valve shocking mechanism 310 delivers a shock force to the valving member 300 for freeing the valving element 305 from the valve seat 308. The illustrated shocking mechanism 310 comprises a striker element 320 carried by the armature hub 314, an anvil element 322 carried by the valving member 300 and a positioner 324 coacting with the striker and anvil elements to enable the valving member to assume its condition where one-way flow is permitted after the valving member is shocked and freed from adhesions to the valve seat.

The striker element 320 is illustrated as a tubular cup-like member supported in an armature hub bore 330 and surrounding the stem element 307. See FIGS. 8 and 9. The open end of the striker element 320 is oriented toward the stator hub 312 and defines a frusto-conical cam face 331 surrounding a cylindrical throat 332. The cam face 331 converges inwardly to an annular striker tip 333 forming the striker element inner periphery. The striker element base end 334 seats against the armature hub 314 and defines a central bore 336 opening into the throat 332 and surrounding and spaced from the stem 307. The valve stem element 307 moves freely within and relative to the armature hub 314 and striker element 320 in the direction of the stem axis.

The striker tip 333 impacts the anvil element 322 to transmit shock forces to the valving member 302. The illustrated anvil element 322 comprises a rigid annulus 338 supported in a peripheral stem element groove 340, snap rings 342a, 342b disposed in the stem groove 340 on opposite axial faces of the annulus 338 and a return spring 346 reacting between the annulus 338 and the stem element 307. The annulus 338 is slidably received between the snap rings 342 and defines an inner periphery whose diameter is greater than the stem element diameter. The return spring 346 is best illustrated in FIGS. 9 and 10 as a resiliently deflected cantilever blade anchored in the annulus 338 and extending from the annulus inner periphery to engagement with the stem groove base. The stressed spring blade 346 biases the annulus 338 away from the stem centerline so that an arcuate portion of the anvil side face 350 confronts, but is spaced from, the striker tip 333 when the solenoid is deenergized.

When the solenoid is energized, the armature 304 accelerates toward the anvil element so the striker tip 333 smartly impacts the anvil side face 350. The preferred embodiment of the invention provides for a striker tip travel of about 0.030 inches before impacting the anvil. This distance, even though relatively small, enables the armature and striker element to develop sufficient kinetic energy to assure that at and after the collision, the valving member 302 is unstuck and capable of readily unseating so long as the solenoid is energized.

The impact energy and force are transferred to the stem element 307 from the annulus 338 via the snap ring 342b. When the collision occurs, the resultant impulse is delivered to the valving element through the stem element as a shock force which produces shock-like tensile stresses in any adhesion between the valving element 305 and the seat 308. Adhesions formed by ice crystals have little resilience, particularly in tension, and thus tend to fracture.

After the initial collision, the striker element continues to travel in the direction of the stator hub 312, pushing the anvil annulus 338 before it. The positioner 324 guides the annulus radially out of the striker tip path as the armature hub 314 continues to move through its stroke. The anvil element is thus retracted from further contact with the striker enabling the armature to complete its stroke and condition the valve assembly 300 for delivering air to the catalytic converter.

The illustrated positioner 324 comprises a tubular stator hub extension projecting from the stator hub 312 into engagement with the anvil annulus 338. The positioner 324 defines a short, inwardly convergent frusto-conical cam face 362 lightly engaging the radially outermost peripheral portion of the anvil annulus face 364 when the valving element is seated and the solenoid is deenergized (as shown in FIGS. 8 and 9). When the striker element collides with the anvil annulus face 364 the annulus 338 is shifted along the cam face 362 both axially and radially inwardly, further deflecting the spring 346. The annulus 338 moves completely across the cam face 362 and is received within a countersunk open end 366 of the stator hub extension 324.

As the annulus 338 moves across the cam face 362 it shifts the valving element a slight distance (slightly less than the axial dimension of the cam face 362) axially away from the valve seat, further insuring that adhesions between the valving element and the seat are interrupted. The annulus 338 slides freely on the snap ring faces as it moves radially with respect to the stem element.

The armature completes its stroke with the striker tip 333 closely adjacent (preferably about 0.001 inches) but spaced from the positioner 324. As the armature stroke is being completed and the annulus 338 shifts into the open positioner end 366, the stem element is again free to move relative to the stator hub 312 and the armature hub 314. The spring forces acting on the stem element 307 reclose the valve member.

As the valve member recloses, the annulus 338 shifts out of the countersunk hub extension opening 366 and into the striker element throat 332 which is coaxial and aligned with countersunk open hub extension end 366. The striker cam face 331 and the positioner cam face 362 are parallel and disposed close to, but not touching, each other so long as the solenoid remains energized. When the valving member 302 opens, the annulus shifts back into the hub extension open end. When the valving member 320 recloses, the annulus 338 shifts into the striker element throat 332 again.

When the solenoid is deenergized the striker element 320 shifts away from the stator hub extension 324 as the valve member closes. The annulus 338 is withdrawn from the striker element throat by the valve stem 307. The return spring 346 returns the annulus 338 to its initial (FIG. 10) position radially aligned with the striker tip 333. The annulus is thus repositioned for shocking the valving element when the solenoid is next energized. The valve assembly 300 is thus returned to its FIG. 8 condition.

While preferred embodiments of the invention have been illustrated and described in detail, the present invention is not to be considered limited to the precise constructions disclosed. For example, although the shocking mechanism 310 and the resilient, low friction valve seat material have been illustrated as used together on a valve assembly, they might be separately employed. Various adaptations, modifications and uses of the invention may occur to those skilled in the art to which the invention relates and the intention is to cover hereby all such adaptations, modifications and uses which fall within the spirit or scope of the appended claims.

Having described my invention I claim:

1. A poppet valve assembly comprising:

a valve housing defining a chamber and first and second spaced apart flow openings enabling flow through said chamber;

a valve seat surrounding one opening;

a valving member comprising a valving element positioned for engagement with said valve seat and a stem element fixed to and projecting from said valving element, said valving element movable between an open position spaced from said valve seat for enabling fluid flow through said housing and a closed position engaged with said valve seat;

a solenoid assembly comprising an armature movable with respect to said valving member and said valve housing, said solenoid having an energized condition wherein said armature is subjected to an electromagnetic force and a de-energized condition;

a spring system reacting between said housing and said valving member and coacting with said solenoid assembly to control positioning of said valving member; and a valving member shocking mechanism for transmitting a shock to material adhered to said valve seat and to said valving element when said solenoid is energized, said shocking mechanism comprising a striker movable by said solenoid assembly through a predetermined stroke when said solenoid assembly is energized and an anvil supported for movement with respect to said striker and said valve member, said striker impacting said anvil to abruptly move said valving element away from said valve seat, said anvil moving relative to said striker to enable said striker to complete said stroke with said valve element reengaged with said seat so that said valving element is free to be unseated from the seat.

2. The valve assembly claimed in claim 1 employed as a one-way air flow, said spring system urging said valving member to said closed position with a first spring force when said solenoid assembly is deenergized, said solenoid assembly energized to oppose said spring system so that said valving member is urged to said closed position by a second force less than said first force when said solenoid is energized.

3. The valve assembly claimed in claim 1 wherein one of said valve seat and said valving element carries a resilient low friction film defining a resilient low friction seating surface.

4. The valve assembly claimed in claim 3 wherein said film comprises a substrate formed by a rubber-like resilient material and a surface formed by a low friction coating.

5. The valve assembly claimed in claim 1 wherein said striker impacts said anvil shortly after said solenoid is energized and during an initial portion of said stroke.

6. The valve assembly claimed in claim 1 further comprising a positioner coacting with said anvil for shifting said anvil out of engagement with said striker after said striker impacts said anvil.

7. The valve assembly claimed in claim 6 wherein said anvil is movable relative to said positioner and said striker as said valving member opens and recloses during said stroke.

8. Method of operating a valve assembly comprising:

providing a valving member comprising a valving element and a valving stem projecting from said valving element;

seating said valving element against a valve seat to block air flow through the seat;

biasing said valving member toward said seat;

moving an actuator member relative to said valving member through a predetermined stroke to alter the biasing force applied to said valving member; and, shocking the valving member while moving the actuator member through said stroke to momentarily unseat the valving element and enable unseating the valving element against the altered biasing force after the actuator member stroke has been completed.

9. The method claimed in claim 8 wherein shocking the valving member comprises impacting the actuator member against an impulse transmitting anvil member after moving said actuator member a predetermined distance and transmitting the impulse to said valving member.

10. The method claimed in claim 9 further comprising shifting said impulse transmitting anvil member out of the path of said actuator member and completing said stroke after impacting said impulse transmitting anvil member.

11. A poppet valve assembly comprising:

a valve housing defining a chamber and first and second spaced apart flow openings enabling flow through said chamber;

a valve seat surrounding one opening;

a valving member comprising a valving element positioned for engagement with said valve seat and a stem element fixed to and projecting from said valving element, said valving element movable between an open position spaced from said valve seat for enabling fluid flow through said housing and a closed position engaged with said valve seat;

a solenoid assembly comprising an armature movable with respect to said valving member and said valve housing, said solenoid having an energized condition wherein said armature is subjected to an electromagnetic force and a de-energized condition;

a spring system reacting between said housing and said valving member and coacting with said solenoid assembly to control positioning of said valving member, said spring system urging said valving member to said closed position with a first spring force when said solenoid assembly is deenergized, said solenoid assembly energized to oppose said spring system so that said valving member is urged to said closed position by a second spring system force less than said first force when said solenoid is energized; and anti-adhesion structure operative to shed material bridging the valve seat and the valving member when said solenoid is energized and enable seating and unseating of said valving member.

12. The poppet valve assembly claimed in claim 11 wherein said anti-adhesion structure comprises a valve member shocking mechanism comprising a striker connected to said armature for movement therewith when said solenoid is energized, and an anvil carried by said valving member, said striker impacting said anvil when said solenoid is energized.

13. The poppet valve assembly claimed in claim 12 wherein said anti-adhesion structure further comprises a positioner coacting with said anvil for shifting said anvil out of engagement with said striker after said striker impacts said anvil.

14. The poppet valve assembly claimed in claim 11 wherein said anti-adhesion structure further comprises a resilient low friction film defining a resilient low friction seating surface formed on one of said valving element or said seat.

* * * * *